(12) United States Patent
Katsunoi

(10) Patent No.: US 9,247,093 B2
(45) Date of Patent: Jan. 26, 2016

(54) IMAGE PROCESSING APPARATUS, INTEGRATED CIRCUIT, AND IMAGE FORMING APPARATUS

(71) Applicant: Ichiro Katsunoi, Kanagawa (JP)

(72) Inventor: Ichiro Katsunoi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/468,441

(22) Filed: Aug. 26, 2014

(65) Prior Publication Data
US 2015/0077801 A1 Mar. 19, 2015

(30) Foreign Application Priority Data

Sep. 17, 2013 (JP) .................................. 2013-192242
Mar. 3, 2014 (JP) .................................. 2014-040669

(51) Int. Cl.
*H04N 1/00* (2006.01)
*H04N 1/409* (2006.01)
*H04N 1/203* (2006.01)

(52) U.S. Cl.
CPC ........... *H04N 1/0097* (2013.01); *H04N 1/2032* (2013.01); *H04N 1/4092* (2013.01); *H04N 2201/0094* (2013.01)

(58) Field of Classification Search
USPC ............ 358/1.13, 1.14, 1.15, 1.16, 1.18, 406, 358/474, 496, 1.9
See application file for complete search history.

(56) References Cited

U.S. PATENT DOCUMENTS

| 5,915,075 | A * | 6/1999 | Kadowaki | G06T 11/001 358/1.9 |
| 6,891,638 | B1 * | 5/2005 | Iizumi | H04N 1/50 358/1.9 |
| 7,411,694 | B2 * | 8/2008 | Nomizu | G06T 1/60 358/1.16 |
| 7,861,040 | B2 * | 12/2010 | Okuyama et al. | 711/120 |
| 8,777,343 | B2 * | 7/2014 | Ishikawa | G06K 15/107 347/9 |
| 8,810,869 | B2 * | 8/2014 | Gyobu | 358/474 |
| 2006/0143286 | A1 * | 6/2006 | Aoki et al. | 709/220 |
| 2007/0002348 | A1 * | 1/2007 | Hagiwara | 358/1.13 |

FOREIGN PATENT DOCUMENTS

JP 2008-234065 10/2008

* cited by examiner

*Primary Examiner* — Allen H Nguyen
(74) *Attorney, Agent, or Firm* — Harness, Dickey & Pierce, P.L.C.

(57) ABSTRACT

An image processing apparatus includes an image processing unit performing image processing in accordance with an image processing parameter; a first control unit storing the image processing parameter, which is to be used by the image processing unit, in association with address information, which is used to store the image processing parameter in the image processing unit, into a first storage unit on a basis of the image processing performed by the image processing unit; and a memory access unit writing the image processing parameter, which is read from the first storage unit, based on the address information in association with the image processing parameter on the basis of the image processing of the image processing unit.

9 Claims, 7 Drawing Sheets

FIG.1

IMAGE PROCESSING APPARATUS, INTEGRATED CIRCUIT, AND IMAGE FORMING APPARATUS

CROSS-REFERENCE TO RELATED APPLICATIONS

The present application is based on and claims the benefit of priority under 35 U.S.C §119 of Japanese Patent Application Nos. 2013-192242 filed on Sep. 17, 2013, and 2014-040669 filed on Mar. 3, 2014, the entire contents of which are hereby incorporated herein by reference.

BACKGROUND OF THE INVENTION

1. Field of the Invention

The present invention generally relates to an image processing apparatus, an integrated circuit, and an image forming apparatus.

2. Description of the Related Art

In an image forming apparatus such as a copier, a printer, a facsimile machine, and a multifunction peripheral (MFP), a manuscript reading unit such as a scanner is known having, for example, a mechanism to simultaneously read the front and the rear sides of a double-sided manuscript (draft) with a single sheet feed ("one-path double-sided simultaneous reading mechanism"). With the manuscript reading unit, image data on two surfaces can be read in a time period for reading image data on a single surface. Therefore, the read time can be reduced.

However, in a case where two surfaces of the image data are transmitted to an output apparatus, if an image processing unit is duplexed, the cost is increased. To overcome the problem, there is a proposed method in which the image processing is performed on a surface of the image data on a one-by-one basis and transmitted to an output device.

In the manuscript reading unit, a sensor for reading the front surface of a manuscript (draft) is physically different from a sensor for reading the rear surface of the manuscript. Therefore, the color and the like of the image data input by the sensors may be somewhat different from each other. To compensate for the difference, there is a known method in which the image qualities of the front and the rear surfaces are adjusted to be similar to each other by rewriting the image processing parameters of the front and the rear surfaces (see, for example, Japanese Laid-open Patent Publication No. 2008-234065, hereinafter "Patent Document 1").

SUMMARY OF THE INVENTION

According to an aspect of the present invention, an image processing apparatus includes an image processing unit performing image processing in accordance with an image processing parameter; a first control unit storing the image processing parameter, which is to be used by the image processing unit, in association with address information, which is used to store the image processing parameter in the image processing unit, into a first storage unit on a basis of the image processing performed by the image processing unit; and a memory access unit writing the image processing parameter, which is read from the first storage unit, based on the address information in association with the image processing parameter on the basis of the image processing of the image processing unit.

BRIEF DESCRIPTION OF THE DRAWINGS

Other objects, features, and advantages of the present invention will become more apparent from the following description when read in conjunction with the accompanying drawings, in which:

FIG. 1 is a drawing illustrating an example schematic configuration of an image forming apparatus according to a first embodiment;

DETAILED DESCRIPTION OF THE PREFERRED EMBODIMENTS

Figure 2:
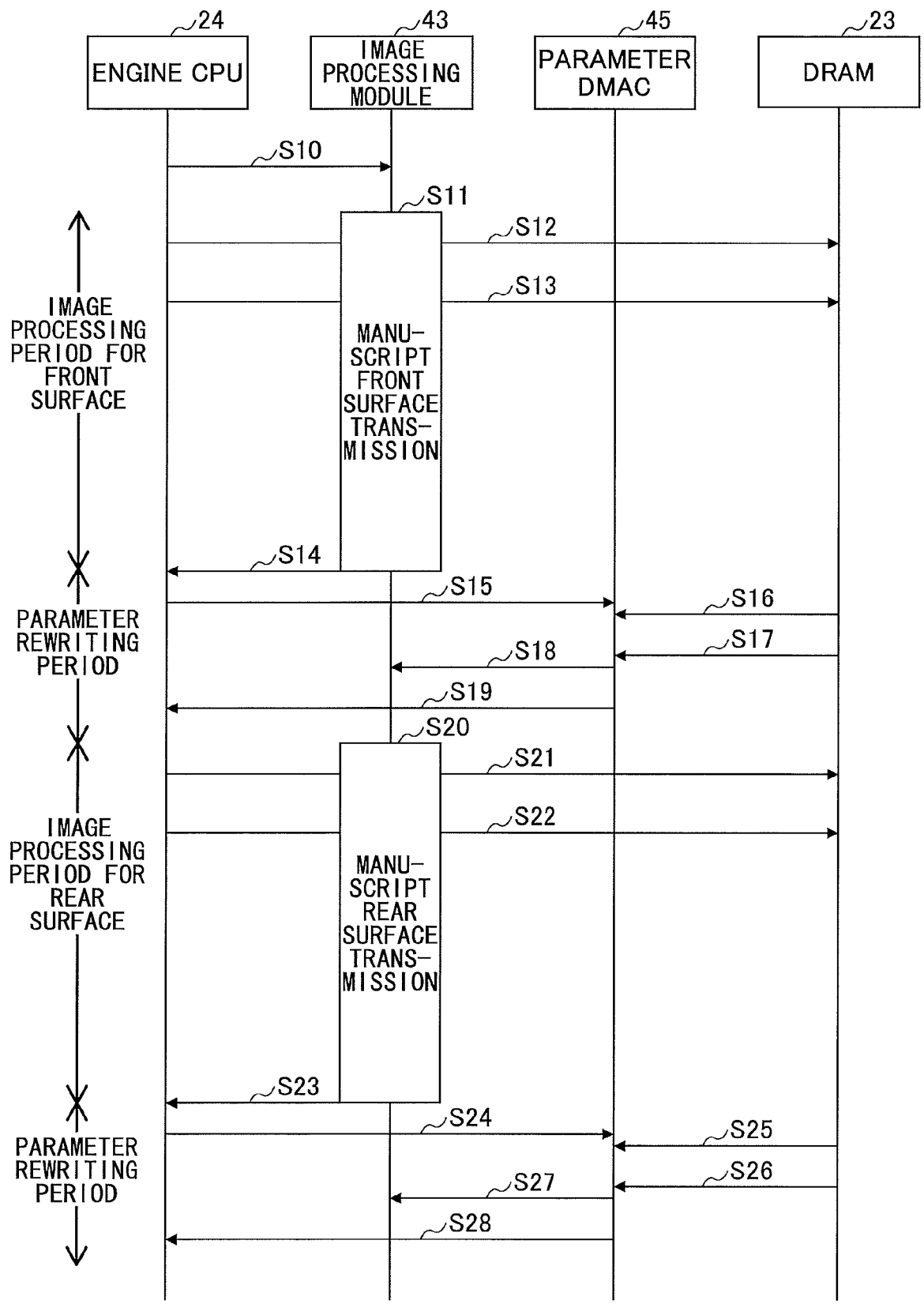
FIG. 2 is a sequence diagram of an example control sequence according to the first embodiment.

In related technologies, especially in the method described in Patent Document 1, an image processing parameter is written by setting the header address and the transmission amount of the image processing module into which the image processing parameter is to be written and sequentially incrementing the address from the header address for the image processing module. Therefore, in the method of Patent Document 1, in a case where, for example, it is desired to rewrite only an image processing parameter which is different between the front surface and the rear surface of the manuscript, it is not possible to write a parameter relative to an arbitrary parameter register.

According to one aspect of the present invention, an object is to rapidly rewrite a parameter.

In the following, embodiments of the present invention are described in detail.

First Embodiment

Image Forming Apparatus: Schematic Configuration

Figure 1:
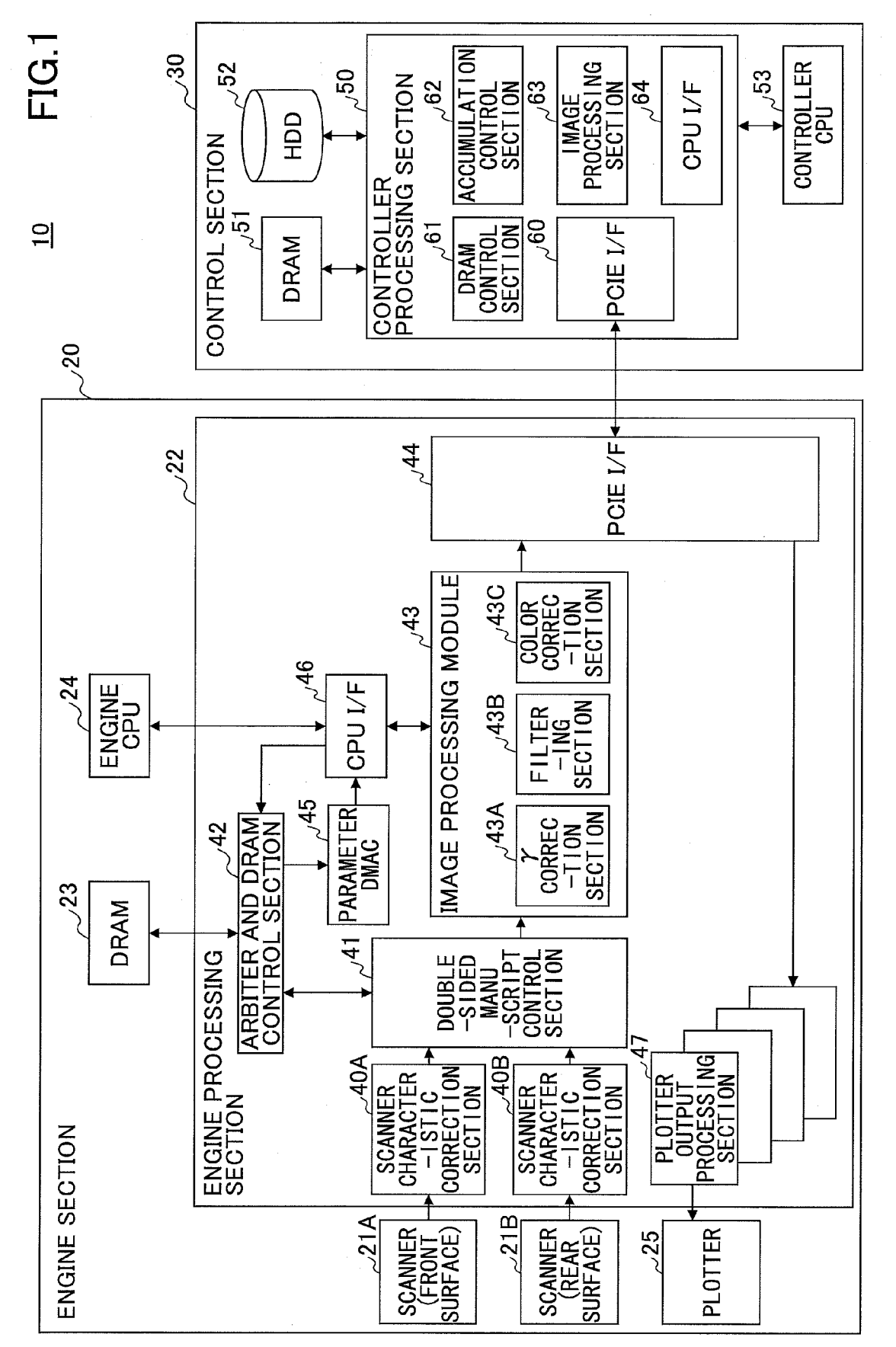

FIG. 1 illustrates an example schematic configuration of an image forming apparatus according to a first embodiment. With reference to FIG. 1, main elements of the image forming apparatus are mainly described. An image forming apparatus 10 of FIG. 1 is a Multifunction Peripheral (MFP) having functions such as a printer, a scanner, a copier, and a facsimile machine. The image forming apparatus 10 includes, for example, an engine section 20 and a control section 30.

The engine section 20 of FIG. 1 is an example of an image processing apparatus that performs image processing using an integrated circuit such as an Application Specific Integrated Circuit (ASIC).

The engine section 20 includes a scanner 21, an engine processing section 22, a Dynamic Random Access Memory (DRAM) 23, which is an example of a first storage unit, an engine Central Processing Unit (CPU) 24, which is an example of a first control unit, and a plotter 25.

The engine section 20 has the "one-path double-sided simultaneous reading mechanism" to simultaneously read the front and the rear sides of a double-sided manuscript (draft) with a single sheet feed. The scanner 21 is a device to read (an image formed) on an input manuscript (draft). The scanner 21 includes a scanner 21A to read the front surface of the input manuscript and a scanner 21B to read the rear surface of the input manuscript.

The engine processing section 22 may be provided as an integrated circuit such as an Application Specific Integrated Circuit (ASIC) as described above. The engine processing section 22 includes a scanner characteristic correction section 40, a double-sided manuscript control section 41, an arbiter and DRAM control section 42, an image processing module 43, which is an example of an image forming unit, a PCIe Endpoint (PCIE) I/F 44, a parameter Direct Memory Access Controller (DMAC) 45, which is an example of a memory access unit, a CPU I/F 46, and a plotter output processing section 47.

The scanner characteristic correction section 40 corrects data characteristics which may vary due to, for example, differences of the characteristics of the Charged Coupled Devices (CCDs) used in the scanner 21. For example, the scanner characteristic correction section 40 includes a scanner characteristic correction section 40A which performs the correction on the data acquired by the scanner 21A (i.e., front-surface manuscript data) and a scanner characteristic correction section 40B which performs the correction on the data acquired by the scanner 21B (i.e., rear-surface manuscript data).

The scanner characteristic correction section 40A and the scanner characteristic correction section 40B perform processes such as, for example, a shading correction, a gamma (γ) conversion (correction), a filtering process (correction), and a color conversion. Herein, the term "color conversion" does not refer to a conversion from RGB to CMYK or the like, but refers to, for example, a conversion from RGB in which scanner characteristics are not corrected to general RGB. It should be noted that the color conversion herein is not limited to this conversion.

The double-sided manuscript control section 41 temporarily stores the two surfaces of the image data, which have been corrected by the scanner characteristic correction section 40A and the scanner characteristic correction section 40B, into the DRAM 23 via the arbiter and DRAM control section 42. The double-sided manuscript control section 41 sequentially reads the two surfaces of the image data stored in the DRAM 23 one by one (i.e., on a one surface basis) and outputs the read image data to the image processing module 43.

The arbiter and DRAM control section 42 controls the accesses to the DRAM 23. For example, when the double-sided manuscript control section 41, the parameter DMAC 45, and the engine CPU 24 are to access to the DRAM 23, the arbiter and DRAM control section 42 controls the accesses to the DRAM 23 by adjusting to determine, for example, from which the accesses are to be done.

The image processing module 43 herein refers to a set of modules including one or more image processing modules to perform the respective image processing tasks on the input image data. For example, the image processing module 43 includes a "γ" correction section 43A, which performs the "γ" correction in accordance with the scanner characteristics on the image data, a filtering section 43B, which changes the frequency characteristics for edge enhancement, smoothing, etc., and a color correction section which converts from scanner color space into a predetermined color space. It should be noted that the types of the image processing modules are not limited to those modules.

The image data on which the image processing is performed by the image processing module 43 are output to the control section 30 via the PCIE I/F 44.

The engine CPU 24 controls the flow of the image data on which the processes are performed by the engine processing section 22. Further, the engine CPU 24 holds image processing parameters which are used for performing the image processing tasks by the image processing module 43. For example, the engine CPU 24 acquires setting information, which is input by a user or the like, indicating the color density to be applied to a manuscript to be read, whether the "γ" correction is to be done, and whether the filtering correction is to be done. Then, the engine CPU 24 holds the image processing parameters generated based on the acquired setting information.

For example, the engine CPU 24 associates the image processing parameter which is desired to be rewritten with an address information indicating a parameter register of the image processing module 43 to which the image processing parameter is to be written, and stores the associated data into the DRAM 23 via the CPU I/F 46. It is desirable to perform the above association for each type of the image processing module 43. However, it should be noted that such associations in the present invention are not limited to this association.

Further, the engine CPU 24 stores descriptor information (identifier, a description information source), which is for reading the image processing parameter stored in the DRAM 23, into the DRAM 23. Then, the engine CPU 24 writes the address information, which indicates the area of the DRAM 23 where the descriptor information is stored, into the parameter DMAC 45. Examples of the descriptor information stored in the DRAM 23 by the engine CPU 24 and the address information corresponding to the image processing parameter are described below.

The parameter DMAC 45 reads the image processing parameter, which is stored in the DRAM 23, based on the descriptor information acquired from the DRAM 23. Then, the parameter DMAC 45 writes the image processing parameter into, for example, a parameter resister of the image processing module 43 via the CPU I/F 46. In this case, the parameter DMAC 45 writes the image processing parameter into, for example, the parameter resister of the image processing module 43 by referring to the address information added to the image processing parameter.

As described above, the DRAM 23 stores the image processing parameter, which is desired to be rewritten, and the corresponding address information. Therefore, it becomes possible for the parameter DMAC 45 to write the image processing parameter which is desired to be rewritten into the parameter register of the image processing module 43 by referring to the address information of the image processing parameter. By doing this, it becomes possible to rapidly rewrite the parameter, thereby improving the productivity due to the reduction of the parameter setting time.

Further, it also becomes possible for the parameter DMAC 45 to set the image forming parameter without the engine CPU 24 intervention. Therefore, it becomes possible to set the image processing parameter faster than when the engine CPU 24 or the like writes the image forming parameter into the parameter register. Further, by setting the image processing parameter by the parameter DMAC 45, the workload of the engine CPU 24 is reduced, so that the performance of the engine CPU 24 corresponding to the reduced workload can be used for another job, thereby enabling to improve the productivity of the entire image forming apparatus 10.

The plotter output processing section 47 outputs the CMYK image data acquired via the PCIE I/F 44 at predetermined timings. The plotter output processing section 47 may include, for example, the DMAC.

In the above description, a case is described where the engine CPU 24 stores the image processing parameter into the DRAM 23 which is disposed outside the engine processing section 22. However, the present invention is not limited to this configuration. For example, the engine CPU 24 may store the image processing parameter in a Static Random Access Memory (SRAM) or the like provided inside the engine processing section 22.

The control section 30 of FIG. 1 includes a controller processing section 50, a DRAM 51, a Hard Disk Drive (HDD) 52, and a controller CPU 53. The controller processing section 50 includes a PCIE I/F 60, a DRAM control section 61, an accumulation control section 62, and an image processing section 63, and a CPU I/F 64.

The PCIE I/F 60 acquires image data via the PCIE I/F 44 of the engine processing section 22. The DRAM control section 61 stores, for example, the image data acquired from the engine processing section 22 and the like.

The accumulation control section 62 controls the accumulation to and the reading from the HDD 52. The image processing section 63 performs various image processing tasks (e.g., a variable magnification process and a gradation process) corresponding to the output form of the image data. The CPU I/F 64 is the interface with the controller CPU 53 that controls the entire image data transmission. The control sections described above may include, for example, the respective DMACs.

When an image is to be copied, the image data of the image output from the control section 30 is output to the plotter 25 via the plotter output processing section 47 corresponding to a plotter engine by the controller CPU 53. Further, when an image is to be scanned, the image data of the image may be directly output to a network by the controller CPU 53.

Control Sequence

FIG. 2 illustrates an example control sequence according to the first embodiment. FIG. 2 illustrates the example of the control sequence of the engine processing section 22 where an output sequence of the signals and instruction between the engine CPU 24, the image processing module 43, the parameter DMAC 45, and the DRAM 23 is described.

As illustrated in FIG. 2, the engine CPU 24 writes the image processing parameter for the front surface of the manuscript into the image processing module 43 (step S10). When the setting of the image processing parameter for the front surface of the manuscript is completed and the image data of the front surface of the manuscript are input, the image processing module 43 performs various image processing tasks on the image data of the front surface of the manuscript in accordance with the image processing parameter (step S11).

While the image processing module 43 performs the various image processing tasks on the image data of the front surface of the manuscript, the engine CPU 24 writes the image processing parameter for the rear surface of the manuscript into the DRAM 23 (step S12), and further writes the descriptor information for the rear surface of the manuscript into the DRAM 23 (step S13). When the image processing tasks performed on the image data of the front surface of the manuscript are completed, the image processing module 43 issues a front-surface manuscript transmission completion notification to the engine CPU 24 (step S14).

In order to perform the image processing on the rear surface of the manuscript, the engine CPU 24 performs control to rewrite the contents in the various types of the parameter registers of the image processing module 43 from the image processing parameters for the front surface of the manuscript to the image processing parameters for the rear surface of the manuscript.

Specifically, upon receipt of the front-surface manuscript transmission completion notification from the image processing module 43, the engine CPU 24 starts up the parameter DMAC 45 (step S15). The parameter DMAC 45 reads the descriptor information for the rear surface of the manuscript from the DRAM 23 (step S16), and further reads the image processing parameters for the rear surface of the manuscript from the DRAM 23 based on the descriptor information for the rear surface of the manuscript (step S17).

The parameter DMAC 45 writes the image processing parameters for the rear surface of the manuscript read from the DRAM 23 into the parameter registers of the image processing module 43 (step S18). When the writing of the image processing parameters instructed in the descriptor information for the rear surface of the manuscript is completed, the parameter DMAC 45 issues a rear-surface manuscript image processing parameter writing completion notification to the engine CPU 24 (step S19).

Upon the receipt of the rear-surface manuscript image processing parameter writing completion notification from the parameter DMAC 45, the engine CPU 24 inputs the image data for the rear surface of the manuscript (i.e., the transmission of the image data for the rear surface of the manuscript) into the image processing module 43. The image processing module 43 performs the various image processing tasks on the image data of the rear surface of the manuscript in accordance with the image processing parameter (step S20).

While the image processing module 43 performs the various image processing tasks on the image data of the rear surface of the manuscript, the engine CPU 24 writes the image processing parameter for the front surface of the manuscript into the DRAM (step S21), and further writes the descriptor information for the front surface of the manuscript into the DRAM 23 (step S22). When the image processing tasks performed on the image data of the rear surface of the manuscript are completed, the image processing module 43 issues a rear-surface manuscript transmission completion notification to the engine CPU 24 (step S23).

In order to perform the image processing on the front surface of the manuscript, the engine CPU 24 performs control to rewrite the contents in the various types of the parameter registers of the image processing module 43 from the image processing parameters for the rear surface of the manuscript to the image processing parameters for the front surface of the manuscript.

Specifically, upon receipt of the rear-surface manuscript transmission completion notification from the image processing module 43, the engine CPU 24 starts up the parameter DMAC 45 (step S24). The parameter DMAC 45 reads the descriptor information for the front surface of the manuscript from the DRAM 23 (step S25), and further reads the image processing parameters for the front surface of the manuscript from the DRAM 23 based on the descriptor information for the front surface of the manuscript (step S26).

The parameter DMAC 45 writes the image processing parameters for the front surface of the manuscript read from the DRAM 23 into the parameter registers of the image processing module 43 (step S27). When the writing of the image processing parameters instructed in the descriptor information for the front surface of the manuscript is completed, the parameter DMAC 45 issues a front-surface manuscript image processing parameter writing completion notification to the engine CPU 24 (step S28). The above control sequence corresponds to one manuscript (i.e., two surfaces (i.e., the front and the rear surfaces) of the manuscript). When there is another manuscript, the same control sequence starting from step S10 is repeated.

Operations Up to Writing the Image Processing Parameters

Figure 3:
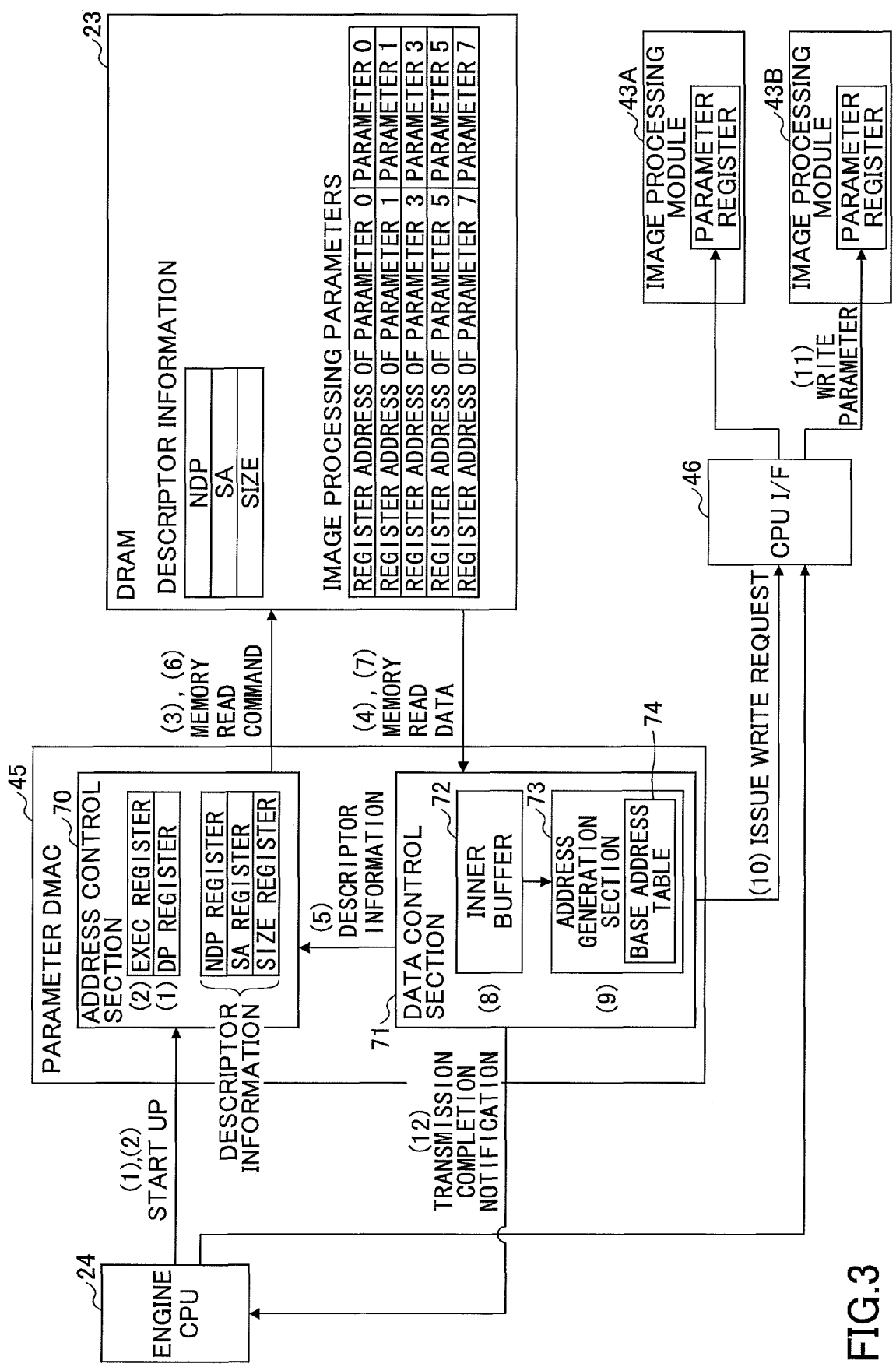
FIG. 3 is a drawing illustrating an example operation until writing of an image processing parameter.

FIG. 3 illustrates example operations up to the writing of the image processing parameters. The example operations of FIG. 3 illustrates the processes in steps S15 to S18 of FIG. 2 and the like. That is, the operation of starting up the parameter DMAC 45 by the engine CPU 24 up to the operation of writing the image processing parameters into the parameter registers of the image processing module 43 by the parameter DMAC 45 are described.

As illustrated in FIG. 3, the parameter DMAC 45 includes an address control section 70 and a data control section 71. The data control section 71 includes an inner buffer 72 and an address generation section 73.

As illustrated in FIG. 3, the engine CPU 24 sets the address of the DRAM 23 where the descriptor information is stored into a Descriptor Pointer (DP) register in the address control section 70 (see (1) in FIG. 3). After checking that image data are not output to the image processing module 43, the engine CPU 24 sets, for example, a value "1" to an EXEC register, as a starting register, in the image processing module 43. By doing this, the parameter DMAC 45 is started (see (2) in FIG. 3).

The address control section 70 of the parameter DMAC 45 issues a read command to the DRAM 23, the read command being for reading the descriptor information stored in the area of the DRAM 23 designated by the DP register (see (3) in FIG. 3). The data control section 71 of the parameter DMAC 45 receives the descriptor information, corresponding to the read command, from the DRAM 23 (see (4) in FIG. 3). Here, it is assumed that the arbiter and DRAM control section 42 exists between the parameter DMAC 45 and the DRAM 23.

Further, the engine CPU 24 stores the image processing parameters in the DRAM 23 in advance, and further stores the descriptor information corresponding to the stored image processing parameters in a predetermined area of the DRAM 23. Here, it is assumed that the engine CPU 24 sets the address of the DRAM 23, the address indicating the area where the descriptor information is stored, into the DP register in the address control section 70 of the parameter DMAC 45.

As illustrated in the DRAM 23 of FIG. 3, in the descriptor information, for example, the items including a Next Descriptor Pointer (NDP), a Start Address (SA), and a SIZE (registers) are registered.

In the NDP, the address of the DRAM 23 is set where the next descriptor information is stored. When the image processing parameters are to be stored in areas which are not continuous, the engine CPU 24 generates the descriptor information corresponding to each of the areas, and writes the address of the DRAM 23 where the next descriptor information is stored into the NDP. As described, by writing the address of the next descriptor information into the NDP, it becomes possible to use the image processing parameters stored in the areas which are not continuous and continuously perform the image processing.

In the SA, for example, a head address (transmission start address) to read data from the DRAM 23 is set. In the SIZE, a transmission data amount (e.g., Byte is used as the unit) is set.

When the data control section 71 of the parameter DMAC 45 transmits the descriptor information, which is acquired from the DRAM 23, to the address control section 70, the address control section 70 stores the descriptor information into the internal registers (see (5) of FIG. 3). The address control section 70 issues a read command to read the image processing parameters, which corresponds to the size (or transmission data amount) designated by the SIZE register and the space area of the DRAM 23 designated by the SA register, and the address information to write the image processing parameters (see (6) in FIG. 3).

The data control section 71 receives the image forming parameters corresponding to the read command from the DRAM 23 and the address information (see (7) in FIG. 3). As illustrated in FIG. 3, for example, the image forming parameters stored in the DRAM 23 by the engine CPU 24 are "parameter 0", "parameter 1", "parameter 3", "parameter 5", and "parameter 7". Those image processing parameters include the resister addresses added thereto as the corresponding address information.

As described above, into the DRAM 23, the engine CPU 24 stores in advance the image processing parameters for rewriting in association with the register addresses of the parameter registers of the image processing module 43 into which the image processing parameters are to be written. By doing this, in the image processing module 43, it becomes possible to rewrite only the image processing parameters for rewriting.

The data control section 71 acquires two or more image processing parameters from the DRAM 23 by burst transmission with, for example, a single write command. In contrast, the data control section 71 transmits one image processing parameter to the image processing module 43 with, for example a single write command as a single transmission.

To absorb the difference in the above transmission rates, the data control section 71 includes the inner buffer 72. The data control section 71 temporarily stores the image processing parameters and the corresponding address information acquired from the DRAM 23 (see (8) in FIG. 3). However, when it becomes impossible to store those data into the inner buffer 72, the data control section 71 outputs those data to the address generation section 73.

The address generation section 73 includes a base address table 74 that can be set by, for example, the engine CPU 24. The address generation section 73 refers to the base address table 74 and adds a base address (base information) corresponding to the started descriptor to the address information acquired from the inner buffer 72 (see (9) in FIG. 3). The address generation section 73 issues a writing request to the image processing module 43, the request being for writing into the address information to which the base address is added (see (10) in FIG. 3).

In the example of FIG. 3, the writing request issued from the parameter DMAC 45 is output to the image processing module 43A ("γ" correction section 43A in FIG. 1) and the image processing module 43B (filtering section 43B in FIG. 1) via the CPU I/F 46. Into the image processing module 43A and the image processing module 43B, the image processing parameters corresponding thereto are written (see (11) of FIG. 3).

When the transmission of the image processing parameters corresponding to the size designated by the SIZE register is completed, the address control section 70 of the parameter DMAC 45 issues a reading command to read the next descriptor information stored in the area of the DRAM 23 designated by the NDP register. By doing this, the above processes (3) through (11) in FIG. 3 are performed.

In a case where the set value designated by the NDP register is, for example, "0" or the like, when the writing of the image processing parameters to the image processing module 43 is completed, the parameter DMAC 45 issues a transmission completion notification to the engine CPU 24 (see (12) of FIG. 3).

Example of Writing of the Image Processing Parameters

Figure 4:
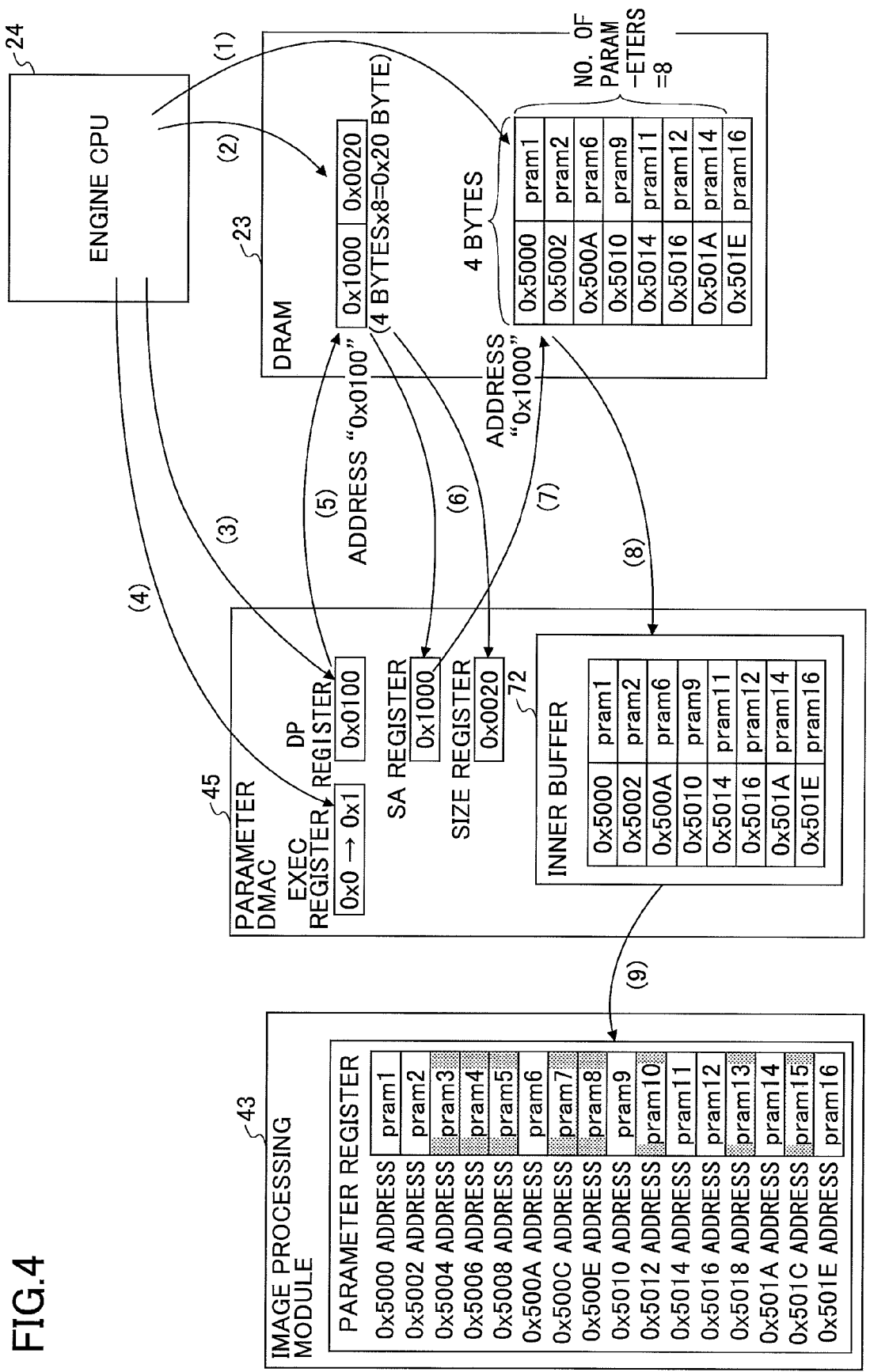
FIG. 4 is a drawing illustrating an example writing operation of the image processing parameter.

FIG. 4 illustrates an example of the writing of the image processing parameters. With reference to the example of FIG. 4, the relationship is described between the image processing parameters stored in the DRAM 23 and the image processing parameters written into the image processing module 43.

As illustrated in FIG. 4, the engine CPU 24 writes, into the DRAM 23, the image processing parameters to be set in the image processing module 43 and the address information of the image processing module 43 into which the image processing parameters are be written (see (1) of FIG. 4).

Specifically, the engine CPU 24 writes the image processing parameter to be written into the image processing module 43 and the addresses of the parameter registers in the image processing module 43 to which the parameter registers are to be written into, for example, the address "0x1000" (e.g., (4 Bytes)×(the number of parameters)=8).

As illustrated in FIG. 4, the writing destinations of the image processing parameters for rewriting such as "pram (parm, parameter)1", "pram2", and "pram6" are the consecutive addresses such as addresses "0x5000", "0x5002", and "0x500A".

The engine CPU 24 writes the descriptor information into, for example, the address "0X0100" of the DRAM 23, the descriptor information indicating the SA (address "0x1000") and the SIZE (4 bytes×8="0X0020") of the DRAM 23 written as describe above (see (2) in FIG. 4).

The engine CPU 24 writes the address (address "0x0100"), in which the descriptor information is stored, into the DP register of the parameter DMAC 45 (see (3) in FIG. 4). Next, the engine CPU 24 writes, for example, a value "1" into the EXEC register of the parameter DMAC 45 (see (4) in FIG. 4).

When the parameter DMAC 45 starts up, the parameter DMAC 45 reads, for example, 4 byte data (SA=0x1000, SIZE=0x0020) from the address "0x0100" of the DRAM 23 designated by the DP register (see (5) of FIG. 4). The parameter DMAC 45 stores the read 4 byte data (SA=0x1000, SIZE=0x0020) into the SA register and the SIZE register, respectively (see (6) of FIG. 4).

The parameter DMAC 45 reads the image processing parameters corresponding to the size (0x0020) designated by the SIZE register and the corresponding address information from the address "0x1000" of the DRAM 23 designated by the SA register (see (7) of FIG. 4). The parameter DMAC 45 stores the image processing parameters and the corresponding address information, which are read from the DRAM 23, into the inner buffer 72 (see (8) of FIG. 4).

When the image processing parameters and the corresponding address information can no longer be stored into the inner buffer 72, the parameter DMAC 45 refers to the address information stored in the inner buffer 72 and writes the image processing parameters into the parameter register of the image processing module 43 (see (9) of FIG. 4).

As illustrated in FIG. 4, the image processing parameters written in the addresses of the parameter register of the image processing module 43 are the "pram(parameter)1", the "pram2", the "pram6" and the like. Here the image processing parameters that are not written in the parameter register of the image processing module 43 are, for example, "pram3", "pram4", "pram5" and the like.

As described above, according to this embodiment, by referring to the address information added to the image processing parameters, it become possible to write the image processing parameters, which are to be written, into the corresponding addresses of the parameter register.

Therefore, for example, when the image processing parameters are to be rewritten between the front surface and the rear surface of the manuscript, it becomes possible to rewrite only the image processing parameters which are different between the front surface and the rear surface of the manuscript.

Accordingly, it becomes possible to reduce the number of the image processing parameters for rewriting.

In this regard, for example, it becomes possible to rewrite the image processing parameter relevant only to the filter coefficient for smoothing from among the image processing parameters for filtering to be used for the filtering section 43B of the image processing module 43 and does not rewrite any of the image processing parameters for edge enhancement. As described above, it becomes possible to write only the image processing parameters for rewriting, thereby quickly enabling rewriting the image processing parameters.

Example of Writing of the Image Processing Parameters

Figure 5:
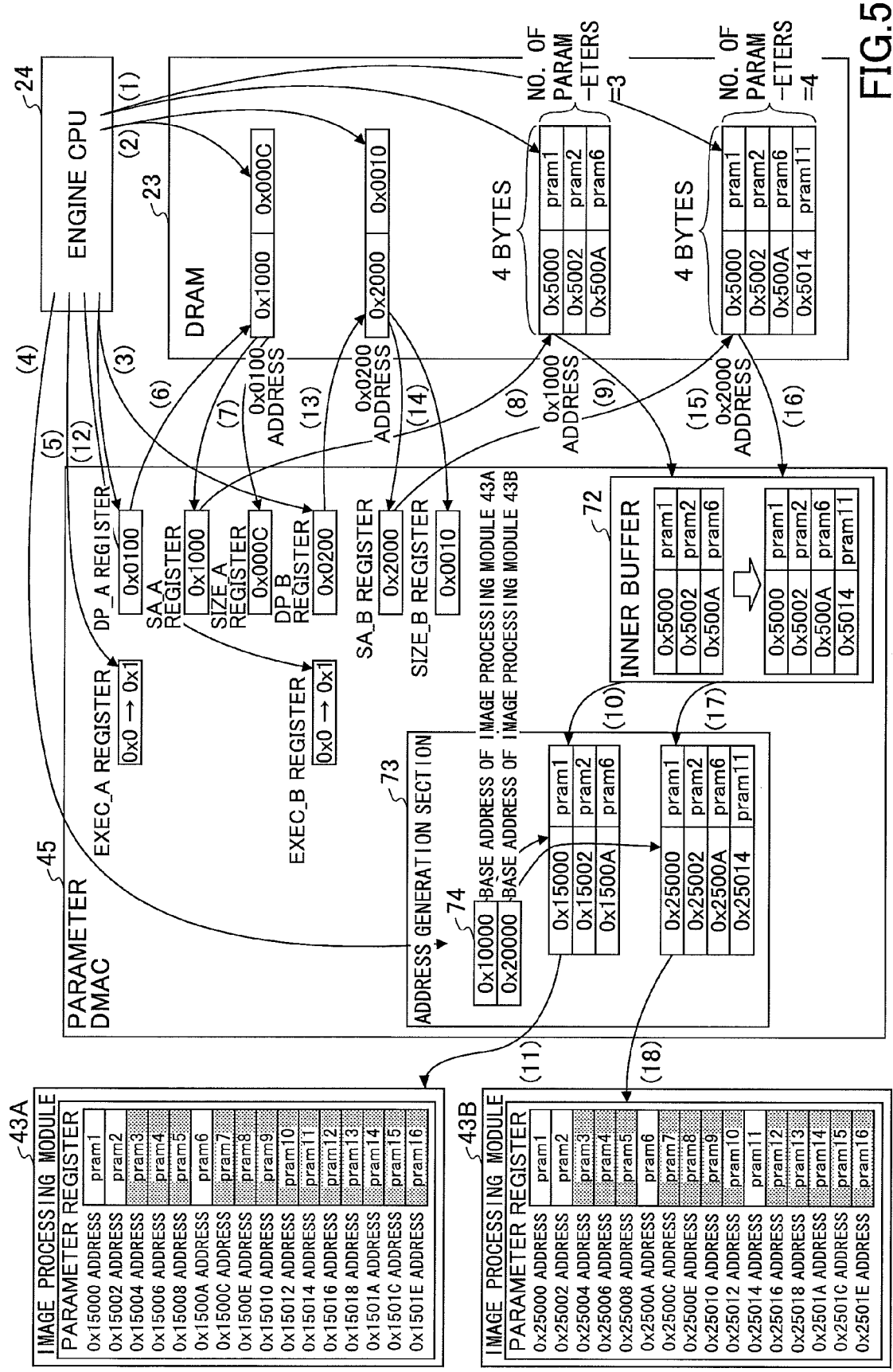
FIG. 5 is a drawing illustrating another example writing operation of the image processing parameter.

FIG. 5 illustrates an example of another writing of the image processing parameters. With reference to the example of FIG. 5, an example of writing the image processing parameters based on multiple descriptor information sources is described.

As illustrated in FIG. 5, the engine CPU 24 writes, into the DRAM 23, the image processing parameters for rewriting into the image processing module 43A (e.g., the "γ" correction section 43A) and the address information of the image processing module 43A corresponding to the image processing parameters (see (1) of FIG. 5). Similarly, the engine CPU 24 writes, into the DRAM 23, the image processing parameters for rewriting into the image processing module 43B (e.g., the filtering section 43B) and the address information of the image processing module 43B corresponding to the image processing parameters (see (1) of FIG. 5).

The engine CPU 24 writes the descriptor information (SA (address "0x1000"), SIZE), which is for the image processing module 43A written as described above, into, for example, the address "0x0100" of the DRAM 23 (see (2) of FIG. 5). Similarly, the engine CPU 24 writes the descriptor information (SA (address "0x2000"), SIZE) for the image processing module 43B into, for example, the address "0x0200" of the DRAM 23 (see (2) of FIG. 5).

The engine CPU 24 writes the address "0x0100", where the descriptor information for the image processing module 43A is stored, into the DP_A register of the parameter DMAC 45 (see (3) of FIG. 5). Similarly, the engine CPU 24 writes the address "0x0200", where the descriptor information for the image processing module 43B is stored, into the DP_B register of the parameter DMAC 45 (see (3) of FIG. 5).

The engine CPU 24 writes the base address "0x10000" of the image processing module 43A and the base address "0x20000" of the image processing module 43B into the base address table 74 of the address generation section 73 of the parameter DMAC 45 (see (4) of FIG. 5). The processes (1) through (4) of FIG. 5 are performed before the parameter DMAC 45 is started up.

The engine CPU 24 writes a value "1" into the EXEC_A register of the parameter DMAC 45 (see (5) of FIG. 5). The parameter DMAC 45 reads, for example, 4 byte data (SA=0x1000, SIZE=0x000C) from the address "0x0100" pf the DRAM 23 designated by the DP_A register (see (6) of FIG. 5). Further, the parameter DMAC 45 stores the read 4 byte data (SA=0x1000, SIZE=0x000C) into the SA_A register and the SIZE_A register, respectively (see (7) of FIG. 5).

The parameter DMAC 45 reads the image processing parameters having the SIZE (=0x000C) designated by the SIZR_A register and the corresponding address information from the address "0x1000" of the DRAM 23 designated by the SA_A register (see (8) of FIG. 5). The parameter DMAC 45 stores the image processing parameters and the corresponding address information, which are read from the DRAM 23, into the inner buffer 72 (see (9) of FIG. 5).

When the image processing parameters and the corresponding address information can no longer be stored into the inner buffer 72, the parameter DMAC 45 acquires information of the inner buffer 72 and output the information to the address generation section 73 (see (1) of FIG. 5). The address generation section 73 refers to the base address table 74, and adds the base address (e.g., "0x10000") corresponding to the started descriptor to the address information acquired from the inner buffer 72 (0x15000, 0x15002, etc.).

The address generation section 73 issues a writing request for writing the image processing parameter to the added address information, and writes the image processing parameters into the parameter register of the image processing module 43A via the CPU I/F 46 (see (11) of FIG. 5). When, for example, the writing (transmission) of the image processing parameters having the SIZE designated by the SIZE_A register is completed, the parameter DMAC 45 issues a writing completion interruption notification to the engine CPU 24.

Further, upon the reception of the writing completion interruption notification from the parameter DMAC 45, the engine CPU 24 writes, for example, a value "1" into the EXEC_B register of the parameter DMAC 45 (see (12) of FIG. 5). The parameter DMAC 45 reads, for example, 4 byte data (SA=0x2000, SIZE=0x0010) from the DRAM address "0x0200" designated by the DP_B register (see (13) of FIG. 5).

The parameter DMAC 45 stored the read 4 byte data (SA=0x2000, SIZE=0x0010) into the SA_B register and the SIZE_B register, respectively (see (14) of FIG. 5). The parameter DMAC 45 reads the image processing parameters having the SIZE (=0x0010) designated by the SIZE_B register and the corresponding register addresses from the address "0x2000" of the DRAM 23 designated by the SA_B register (see (15) of FIG. 5).

The parameter DMAC 45 stores the image processing parameters and the corresponding address information, which are read from the DRAM 23, into the inner buffer 72 (see (16) of FIG. 5). When data are taken out (read) from the inner buffer 72 by the address generation section 73, the data in the inner buffer 72 become no longer necessary. Therefore, when the next data are to be input, the data will be overwritten.

When the image processing parameters and the corresponding address information can no longer be stored into the inner buffer 72, the parameter DMAC 45 acquires information of the inner buffer 72 and output the information to the address generation section 73 (see (17) of FIG. 5). The address generation section 73 refers to the base address table 74, and adds the base address (e.g., "0x20000") corresponding to the started descriptor to the address information acquired from the inner buffer 72 (0x25000, 0x25002, etc.).

The address generation section 73 issues a writing request for writing the image processing parameter to the added address information, and writes the image processing parameters into the parameter register of the image processing module 43B via the CPU I/F 46 (see (18) of FIG. 5). When the writing of the image processing parameters having the SIZE designated by the SIZE_B register is completed, the parameter DMAC 45 issues the writing completion interruption notification to the engine CPU 24.

As described above, it becomes possible to write the image processing parameters based on the multiple descriptor information sources. Further, the parameter DMAC 45 uses the base address table 74. By doing this, even when the address of the parameter register of the image processing module is more than 16 bits, it becomes possible to set the number of bits of the address information to be stored into the DRAM 23 or the like as 16 bits or the like.

By doing this, it becomes possible for the engine CPU 24 to set the format of the image processing parameters and the address information to be stored into the DRAM 23 as "16 bits+16 bits=32 bits" or the like. As a result, it becomes possible to prevent the address management by the engine CPU 24 from being complicated.

Further, as described above, the parameter DMAC 45 includes multiple starting registers that can be controlled by the engine CPU 24, the same number of the descriptor information sources as the number of the starting registers, and unique base addresses corresponding to the descriptor information sources.

Therefore, it becomes possible to select the image processing parameters 43 into which the image processing parameters are to be downloaded from the DRAM 23 depending on whether the starting registers are set by the engine CPU 24. As a result, it becomes possible to optimize the setting time for setting the image processing parameters.

Second Embodiment

Next, a second embodiment of the present invention is described. In the second embodiment, as an example of the engine CPU 24 (a first control unit) in the first embodiment and a second control unit to control the register access of the parameter DMAC 45, a CPU I/F is used.

In response to, for example, a request from the engine CPU 24, the CPU I/F stores the image processing parameters in association with the corresponding address information into a Static Random Access Memory (SRAM) which is an example of a second storage unit. By doing this, it becomes possible to reduce the workload of the engine CPU 24. Further, similar to the first embodiment, by using the parameter DMAC, it becomes possible to write the image processing parameters stored in the SRAM into the parameter registers of the image processing module 43.

Further, there is provided an SRAM MODE register that is to set whether the SRAM or the like is to be used depending on the existence of the parameter DMAC. By having this, it becomes possible for the CPU I/F to respond to the request from the engine CPU 24 by directly writing into the parameter registers of the image processing module 43. In the following, the second embodiment is described in more detail.

Image Forming Apparatus: Schematic Configuration

Figure 6:
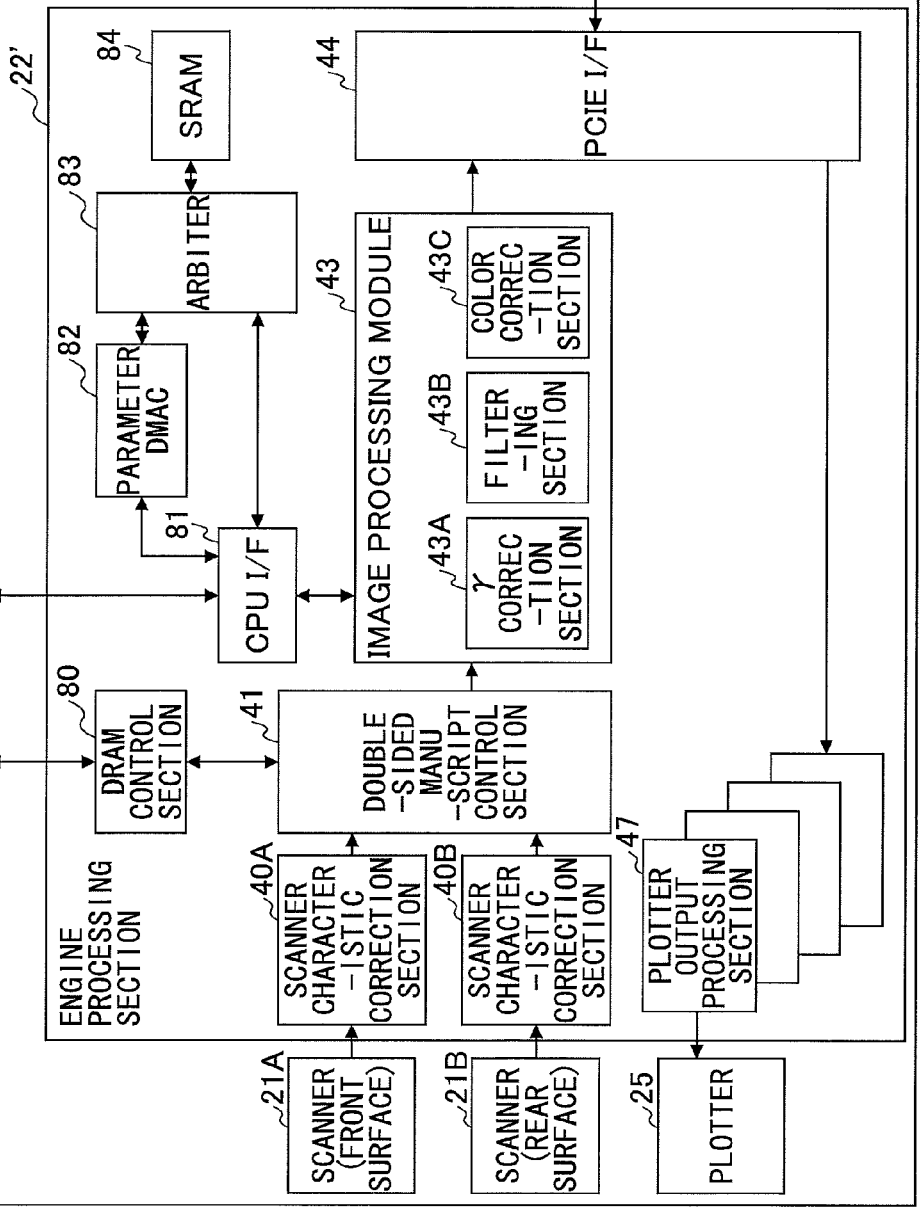
FIG. 6 is a drawing illustrating an example schematic configuration of an image forming apparatus according to a second embodiment.

FIG. 6 illustrates an example schematic configuration of an image forming apparatus according to the second embodiment. An image forming apparatus 10' of FIG. 6 includes an engine section 20' and a control section 30. The engine section 20' includes, for example, the scanner 21, an engine processing section 22', the DRAM 23, the engine CPU 24, and the Plotter 25.

The engine processing section 22' includes the double-sided manuscript control section 41, the image processing module 43, the PCIE I/F 44, plotter output processing section 47, a DRAM control section 80, and a CPU I/F 81, which is an example of the second control unit, a parameter DMAC 82, an arbiter 83, and an SRAM 84 which is an example of the second storage unit.

The engine section 20' of FIG. 9 differs from the engine section 20 in the first embodiment in that the engine section 20' includes the DRAM control section 80, the CPU I/F 81, the parameter DMAC 82, the arbiter 83, and the SRAM 84. The reference numerals are repeatedly used to describe the same element in the engine section 20 in the first embodiment, so that the repeated descriptions thereof are herein omitted and different elements are mainly described below.

The double-sided manuscript control section 41 temporarily stores the two surfaces of the image data, whose data characteristics have been corrected in the scanner characteristic correction section 40A and the scanner characteristic correction section 40B, into the DRAM 23 via the DRAM control section 80. The double-sided manuscript control section 41 sequentially reads the two surfaces of the image data stored in the DRAM 23 one by one (i.e., on a one surface basis) and outputs the read image data to the image processing module 43. For example, the DRAM control section 80 controls the access of the double-sided manuscript control section 41 to the DRAM 23.

The CPU I/F 81 controls the accesses from the engine CPU 24 and the parameter DMAC 82 to the parameter registers of the image processing module 43. Upon receiving a write access (request) to write into the parameter register of the image processing module 43 from the engine CPU 24, the CPU I/F 81 switches the access to, for example, the SRAM 84. Here, the CPU I/F 81 combines the information of the image processing parameters acquired from the engine CPU 24 with the address information of the parameter registers of the image processing module 43, and stores the combined data into the SRAM 84. Therefore, it is not necessary for the engine CPU 24 to write the image processing parameters and the address information into the SRAM 84, thereby reducing the workload of the engine CPU 24.

Further, the CPU I/F 81 includes, for example, an SRAM_MODE register as a register that can be set by the engine CPU 24, and selects whether to use the SRAM 84 in accordance with the existence of the parameter DMAC 82 based on the setting value of the SRAM_MODE register. When the SRAM 84 is used by using the parameter DMAC 82, the CPU I/F 81 stores the image processing parameters and the address information into a predetermined address of the SRAM 84. On the other hand, when the parameter DMAC 82 is not used and the SRAM 84 is not used, the CPU I/F 81 directly writes into the parameter registers of the image processing module 43.

As described above, by providing the register to select whether to use the SRAM 84 in the CPU I/F 81, it becomes possible to respond to both cases where the parameter DMAC 82 is used and not used, and commonalize a circuit of the engine processing section 22'. Further, it is not necessary for the engine CPU 24 to change the access control to the image processing module 43. Therefore, it become possible to write the image processing parameters into the image processing module 43 without causing the control of the engine CPU 24 to be complicated.

The parameter DMAC 82 reads the image processing parameters stored in the SRAM 84 via the arbiter 83, and writes the image processing parameters into, for example, the parameter registers of the image processing module 43 via the CPU I/F 81. In this case, similar to the first embodiment, the parameter DMAC 82 writes the image processing parameters into, for example, the parameter registers of the image processing module 43 based on the address information added to the image processing parameters.

When, for example, the CPU I/F 81 and/or the parameter DMAC 82 attempts to access the SRAM 84, The arbiter 83 adjusts from where to access and controls the access to the SRAM 84.

In the SRAM 84, for example, the image processing parameters for rewriting in association with the address information of parameter registers of the image processing module 43 into which the image processing parameters are written are stored by the CPU I/F 81. In the second embodiment, a case is described where the SRAM 84 is used. However, for example, the CPU I/F 81 may store the image processing parameters and the address information into the DRAM 23 used in the first embodiment.

Example of Storing the Image Processing Parameters into the SRAM 84

Figure 7:
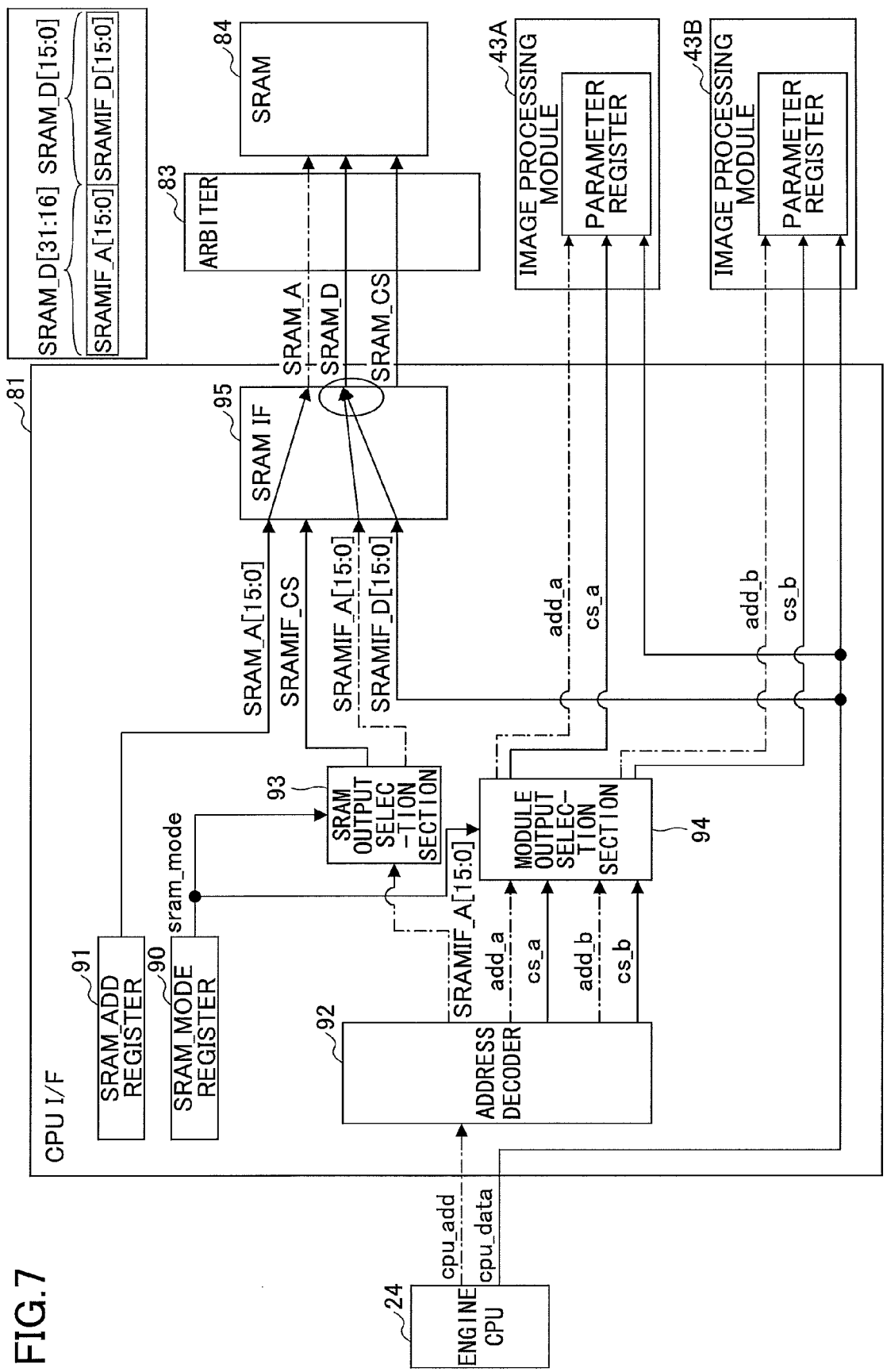
FIG. 7 is a drawing illustrating an example operation until the image processing parameter is stored into a Static Random Access Memory (SRAM).

FIG. 7 illustrates example operations up to storing the image processing parameters into the SRAM 84. The example of FIG. 7 illustrates a case where the process in step S12 of FIG. 2 is applied to the second embodiment. Namely, FIG. 7 illustrates operations up to storing the image processing parameters and the address information into the SRAM 84 by the CPU I/F 81 in response to the request from the engine CPU 24.

The CPU I/F 81 of FIG. 7 includes an SRAM_MODE register 90, an SRAM_ADD register 91, an address decoder 92, an SRAM output selection section 93, a module output selection section 94, and an SRAM I/F 95.

The SRAM_MODE register 90 is a register to set whether to use the SRAM 84 depending on the existence of the parameter DMAC 82. For example, when the SRAM 84 is to be used by using the parameter DMAC 82, a value "1" is set to the SRAM_MODE register 90. For example, when SRAM 84 is not used and the parameter DMAC 82 is not used, a value "0" is set to the SRAM_MODE register 90.

Further, the SRAM_MODE register 90 may be set in advance or may be set by the engine CPU 24. The operations of the CPU I/F 81 are determined based on the setting value of the SRAM_MODE register 90. The SRAM_ADD register 91 is a register to set the address of the SRAM 84 where the image processing parameters are to be stored.

The address decoder 92 identifies the image processing module 43 to be accessed when receiving a write access (e.g., "cpu_add") corresponding to the parameter register of the image processing module 43 from the engine CPU 24. Further, the address decoder 92 generates a chip select (e.g., "cs_a", "ca_b") and an address (e.g., "add_a", "add_b", "SRAMIF_A") corresponding to the identified image processing module 43.

The SRAM output selection section 93 outputs, for example, "SRAMIF_A" to the SRAM I/F 95 when the parameter DMAC 82 is used (e.g., "sram_mode=1").

The module output selection section 94 outputs the chip select ("cs_a", "ca_b") and the address ("add_a", "add_b"), which are generated by the address decoder 92, when the parameter DMAC 82 is not used (e.g., "sram_mode=0").

The SRAM I/F 95 outputs the address of the SRAM 84 (e.g., "SRAM_A"), the write data as the image processing parameter (e.g., "SRAM_D"), and the chip select (e.g., "SRAM_CS") to the SRAM 84 via the arbiter 83. Operations when "0" is set in the SRAM_MODE register Here, operations when "0" is set in the SRAM_MODE register are described. Upon receiving the write access (e.g., "cpu_add") to access the parameter register of the image processing module 43 from the engine CPU 24, the address decoder 92 identifies the image processing module 43 to be accessed.

In the case of "sram_mode=0", the module output selection section 94 outputs the chip select (e.g., "cs_a", "ca_b") and the address (e.g., "add_a", "add_b", "SRAMIF_A"), which are generated by the address decoder 92, identifying the image processing module 43. By doing this, the write access is performed on the image processing modules 43A and 43B. Further, in the case of "sram_mode=1", the output of the module output selection section 94 is masked with (set to) "0", so that the output is not allowed. Operations when "1" is set in the SRAM_MODE register Here, operations when "1" is set in the SRAM_MODE register are described. Upon receiving the write access (e.g., "cpu_add") to access the parameter register of the image processing module 43 from the engine CPU 24, the address decoder 92 identifies the image processing module 43 to be accessed. The address decoder 92 generates the chip select (e.g., "cs_a", "ca_b") and an address (e.g., "add_a", "add_b", "SRAMIF_A") identifying the image processing module 43. In this case, address decoder 92 generates by regarding the address of the module to be accessed as "SRAMIF_A". For example, when the module, to which the engine CPU 24 is going to write access, is the image processing module 43A, the chip select is set as "cs_a=1" and "cs_b=0" and the value of "add_a" is assigned to "SRAMIF_A".

In the case of "sram_mode=1", the SRAM output selection section 93 outputs the "SRAMIF_A" generated by the address decoder 92. Further, in the case of "sram_mode=1", the write access to the SRAM 84 is allowed, and the "SRAM_CS=1" generated by the SRAM output selection section 93 is input into the SRAM I/F 95.

In the case of "SRAMIF_CS=1", the SRAM I/F 95 is allowed to access the SRAM 84. The SRAM I/F 95 generates the address of the SRAM 84 (e.g., "SRAM_A"), the write data (e.g., "SRAM_D"), and the chip set (e.g., "SRAM_CS"), and outputs the generated data to the SRAM 84.

As the address of the SRAM 84 (e.g., "SRAM_A"), the set value set in the SRAM_ADD register 91 is input. As the write data (e.g., "SRAM_D"), the combination data of "SRAMIF_A" and "SRANIF_D" are input. Further, in FIG. 7, an example is illustrated where the combination is done by assuming that "SRAMIF_D[15:0]" is "SRAM_D[15:0]" and "SRAMIF_A[15:0]" is "SRAM_D[31:16]" (see FIG. 7). However, the combination method is not limited to this example. Further, as the chip set (e.g., "SRAM_CS"), "SRAMIF_CS" is input.

As described above, when "1" is set to the SRAM_MODE register, the address information and the image processing parameters, which are write accessed by the engine CPU 24, are combined as the write data to the SRAM 84 and stored into the SRAM 84 via the arbiter 83.

Further, the address data and the image processing parameters stored in the SRAM 84 are read by the parameter DMAC 82 started by the engine CPU 24 and written into the parameter registers of the image processing module 43 similar to the descriptions in the first embodiment explained with reference to FIGS. 3 through 5.

According to the above embodiments, it becomes possible to rapidly rewrite the parameters. Further, by providing the second control unit, it becomes possible to rewrite the parameters while reducing the workload of the first control unit. Further, it becomes possible to rewrite the parameters regardless of whether the parameter DMAC is used or not without causing the control of the engine CPU 24 to be complicated.

In the above embodiments, as an example of an image forming apparatus, an MFP is described.

However, the present invention is not limited to this configuration. For example, the present invention may also be applied to an apparatus that outputs an image or video data, or an apparatus in which only an arbitrary parameter is rewritten based on parameter difference management.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image processing unit configured to perform image processing in accordance with an image processing parameter;
a first control unit configured to store the image processing parameter, which is to be used by the image processing unit, in association with address information, which is used to store the image processing parameter in the image processing unit, into a first storage unit on a basis of the image processing performed by the image processing unit; and
a memory access unit configured to write the image processing parameter, which is read from the first storage unit, based on the address information in association with the image processing parameter on the basis of the image processing of the image processing unit, and further configured to, store the image processing parameter into a buffer thereof and when it is not possible to store the image processing parameter into the buffer, refer to the address information stored in the buffer, and write the image processing parameter in a set register set in the image processing unit.

2. The image processing apparatus according to claim 1, further comprising:
a second control unit configured to, in response to a request from the first control unit, store the image processing parameter in association with the address information into a second storage unit.

3. The image processing apparatus according to claim 2, wherein the second control unit includes a setting unit that is configured to set whether to use the second control unit and,
wherein, when the setting unit sets that the second control unit is to be used, the second control unit is configured to store the image processing parameter and the address information into the second storage unit.

4. The image processing apparatus according to claim 3, wherein, when the setting unit does not set that the second control unit is to be used, the second control unit is configured to write the image processing parameter based on the address information on the basis of the image processing of the image processing unit.

5. The image processing apparatus according to claim 2, wherein the memory access unit is configured to write the image processing parameter, which is read from the first storage unit or the second storage unit, based on the address information on the basis of the image processing of the image processing unit.

6. The image processing apparatus according to claim 2, wherein the memory access unit is configured to write the image processing parameter based on the address information, which is acquired from the first storage unit or the second storage unit, and based on address information which is acquired from base information on the basis of the image processing of the image processing unit.

7. The image processing apparatus according to claim 1, wherein the memory access unit is configured to perform rewriting of the image processing parameter relative to the image processing unit on the image processing parameter which differs depending on whether the image processing parameter is for front-surface data or rear-surface data of manuscript data on which the image processing is to be performed.

8. An image forming apparatus comprising:
the image processing apparatus according to claim 1.

9. An integrated circuit comprising:
an image processing unit configured to perform image processing in accordance with an image processing parameter; and
a memory access unit configured to
- read the image processing parameter from a first storage unit storing the image processing parameter, which is to be used by the image processing unit, in association with address information, which is used to store the image processing parameter in the image processing unit, on a basis of the image processing performed by the image processing unit,
- write the read image processing parameter based on the address information on the basis of the image processing of the image processing unit,
- store the image processing parameter into a buffer thereof, and
when it is not possible to store the image processing parameter into the buffer, refer to the address information stored in the buffer, and write the image processing parameter in a set register set in the image processing unit.

\* \* \* \* \*